United States Patent [19]

George et al.

[11] 4,043,679

[45] Aug. 23, 1977

[54] SELF-LEVELING CONSTRUCTION ALIGNMENT LASER

[75] Inventors: Lyndell J. C. George; Robert S. Shelly, both of Jacksonville, Ark.

[73] Assignee: AGL Corporation, Jacksonville, Ark.

[21] Appl. No.: 718,612

[22] Filed: Aug. 30, 1976

Related U.S. Application Data

[62] Division of Ser. No. 624,238, Oct. 20, 1975.

[51] Int. Cl.² ............................................. G01C 9/18
[52] U.S. Cl. ................................ 356/249; 350/16; 350/17; 356/148; 356/153
[58] Field of Search ............... 356/138, 148, 153, 172, 356/249, 250; 350/16, 17, 205; 33/286, 290

[56] References Cited

U.S. PATENT DOCUMENTS

| 3,116,557 | 1/1964 | Trice | 33/228 |
|---|---|---|---|
| 3,229,070 | 10/1966 | Blount et al. | 219/377 |
| 3,488,854 | 1/1970 | Trice | 33/286 |
| 3,631,601 | 1/1972 | McNulty | 33/228 |
| 3,684,381 | 8/1972 | Zoot | 356/138 |
| 3,894,805 | 7/1975 | Middleton | 356/138 |
| 3,897,637 | 8/1975 | Genho | 33/227 |
| 3,905,707 | 9/1975 | Feist et al. | 356/249 |
| 3,910,704 | 10/1975 | Richarme | 356/249 |

Primary Examiner—John K. Corbin
Assistant Examiner—Matthew W. Koren
Attorney, Agent, or Firm—Richards, Harris & Medlock

[57] ABSTRACT

The specification discloses an improved system for projecting and utilizing a light beam as a reference line for construction purposes. The system includes a light beam projection device mounted in a housing. A light path compensator is positioned within the housing and intercepts the beam of light emitted by the light beam projecting device and automatically corrects slight deviations of the light beam from true horizontal. A vertically adjustable leg is attached to the front end of the housing and a horizontally pivotable leg is attached to each side of the housing near the rear end of the housing to enable leveling and centering of the housing in a conduit or positioning and leveling on any surface. Structure is controllable from the rear of the housing to deflect the light beam in a vertical plane to vary the grade of the beam projected by the device. An indicator, readable from the rear of the housing, is provided for indicating the grade at which the light beam is projected. Structure is corrected between the support legs and housing for rotating the housing in a horizontal plane to provide azimuthal adjustment of the light beam projected therefrom.

2 Claims, 16 Drawing Figures

SELF-LEVELING CONSTRUCTION ALIGNMENT LASER

This is a division of application Ser. No. 624,238, filed Oct. 20, 1975.

FIELD OF THE INVENTION

This invention relates to an apparatus and method for generating a beam of light as a reference for construction purposes and more particularly for generating and maintaining a highly accurate reference for use in laying pipe at a particular grade from the reference.

PRIOR ART

The proper operation of a pipeline, such as a sewer pipeline, is dependent upon accurately setting the line at a predetermined grade. Prior devices have employed the use of a light in which the beam of light is projected to establish a reference line along which the pipeline is laid. Examples of such prior systems are disclosed in U.S. Pat. No. 3,279,070, entitled "Automatic Grade Light" issued on Oct. 18, 1966, and U.S. Pat. No. 3,116,557, entitled "Method and Means for Laying a Sewer Pipe," issued on Jan. 7, 1964.

In generating an accurate grade reference for laying a pipeline, an accurate reference line along this grade angle must be obtained. In past apparatus, this reference has been generated by appropriately angling the path of the reference beam of light relative to the light projection unit to the desired grade at which the pipeline is to be laid. After selecting the desired grade, the light generating unit is leveled by manipulating leveling screws between the source and the base of the unit until bubble vials mounted on the light generating unit indicate the unit is level. Subsequent to the proper alignment of the reference light beam, the unit's position may often undergo small physical movements caused by movement of workmen around the unit or other external disturbances. Such movements of the unit render the reference line inaccurate and require the complete resetting of the unit after each disturbance. A need has thus arisen for a light alignment system having improved leveling capabilities which are not subject to misalignment effects of small external disturbances.

While the prior pipe alignment devices have worked in practice, these devices have not been satisfactory with respect to ease and simplicity of operation. For example, the systems heretofore used have required expensive and complicated accessories to accurately center the unit within various sizes of pipe. The use of these accessories have not only complicated the operation of the unit but also require the maintenance and storage of the additional elements. These accessories likewise introduced additional expense into the prior art systems. Further, the prior systems have generally not been easily adaptable for various operating modes and conditions.

SUMMARY OF THE INVENTION

The presdent invention provides an improved system for projecting and utilizing a light beam as a reference line for construction purposes which overcomes many of the shortcomings heretofore found in previously developed systems.

In accordance with one embodiment of the present invention, the system includes a light beam projection device mounted in a housing having an opening in the front thereof to allow the projection of a beam of light from the housing. A light path compensator is positioned within the housing and intercepts the beam of light emitted by the light beam projecting device and automatically corrects slight deviations of the light beam from true horizontal. The compensator has a liquid-air interface always parallel to true horizontal wherein compensation is caused by the light beam being reflected therefrom or passing therethrough. A vertically adjustable leg is attached to the front end of said housing and a horizontally pivotable leg is attached to each side of the housing near the rear end of the housing. The horizontally pivotable rear legs are adapted with vertically extendable members so that the housing may be positioned with reference to a conduit center and leveled by the vertical adjustment of the front and rear legs. In this way, the light beam emitted from the housing may be made to coincide with the center line of the conduit.

In accordance with another aspect of the invention, a light path compensator includes structure for directing the light beam from the light projection device along a path perpendicular to the horizontal projection from the light projecting device. First and second fluid tight containers are mounted in sequential positions within the housing in the path of the light beam. Each of the containers has a transparent bottom plate and contains a fluid having an index of refraction substantially equal to the index of refraction of the transparent plate. Upon deviation of the housing from the horizontal such that the containers are tilted, the fluid forms an upper surface at an angle with the lower surface of the transparent plate in a manner which provides correction of the beam deviation from the vertical by one-half of the angle of deviation. The beam is therefore vertical as it exits from the second fluid container. A rotatable section containing a pentaprism is located in the path of the light beam after it has passed through the fluid containers and translates the beam to a selected horizontal direction.

In accordance with another aspect of the invention, a light path compensator includes a fluid tight container mounted within the housing and having a transparent bottom plate and contains a fluid having an index of refraction substantially equal to the index of refraction of the transparent plate. A prism means is provided for deflecting the light beam emitted from the light projecting device onto the liquid-air interface formed by the top surface of the fluid within the fluid containers. Upon deviation of the housing from the true horizontal, the reflection from this liquid-air interface provides for the correction of the beam deviation from the horizontal.

In accordance with still another aspect of the invention, a light projection system comprises structure controllable from the rear of the housing embodying the light projecting device for deflecting the light beam in a vertical plane to vary the grade of the beam projected by the device. An indicator, readable from the rear of the housing, is provided for indicating the grade at which the light beam is projected.

According to another aspect of the invention, structure is connected between the support legs and the housing for rotating the housing in a horizontal plane thereby providing for azimuthal adjustment of the light beam projected therefrom. A manually operated mechanical override, operable from the rear of the unit, is further provided for manually rotating the housing relative to the legs in the horizontal plane.

In accordance with another aspect of the invention, the horizontally pivotable legs are calibrated for equal angular movement from the housing so that the rear of the unit may be centrally positioned within a conduit. The vertically adjustable front leg is adapted with a cone-shaped foot pad and is positioned in the vertical plane passing through the center line of the housing so that the front of the housing is centrally positioned within the conduit when the foot pad is positioned at the lowest point of the conduit. In still another embodiment of the invention, the horizontally pivotable legs are interconnected such that angular movement relative to the housing by one leg is automatically duplicated by the other to assure equal positioning of the horizontally pivotable legs from the unit housing.

In accordance with still another aspect of the invention, the system is adapted for projecting a reference light beam from a remote location. According to this aspect of the invention, the system employs a rectilinear rod and means supporting the rod for rotation about its major rectilinear axis. A line-of-sight device and the light beam projecting device of the present invention are both fixed to the rod and spaced apart thereon in a direction parallel to the axis of the rectilinear rod. The devices are oriented relative to the axis of the rod with the line-of-sight of the line-of-sight device and with the center line of the light beam from the projection device both directed generally transversely to the axis of the rectilinear rod and in a common plane parallel to that axis. Rotary adjustment of the rod about its rectilinear axis to bring the line-of-sight device into alignment with a predetermined point will similarly cause the projected beam of light from the light projecting device to be positioned with its center line in a plane common to the predetermined point and to the line-of-sight of the line-of-sight device. Means are provided for angularly adjusting the devices relative to each other in a plane parallel to the axis of a rectilinear rod. A light path compensator is provided within the light projecting device for intercepting the beam of light and automatically correcting slight deviations of the light beam from true horizontal. The compensators used have a liquid-air interface always parallel to the true horizontal wherein compensation is caused by reflecting light beam from the interface or passing the light beam through the interface. A visible light is positioned in the top center of the light projection device and is visible from the top of the device so that the center may be readily located in lining the line-of-sight device over the light projection device. The light projection device may further be used for projecting a reference light beam from outside the pipeline as from a manhole or open cut. According to this application of the invention, the light projection device is positioned on the horizontal floor of a manhole or open cut, and the reference beam is directed along the desired reference line by making the necessary adjustments about the vertical and grade adjustment axis of the device.

DESCRIPTION OF THE DRAWINGS

For a more complete understanding of the present invention, and for other objects and advantages thereof, reference is now made to the following description taken in conjunction with the accompanying drawings, in which.

DESCRIPTION OF THE PREFERRED EMBODIMENTS

Figures 1, 2, 3:
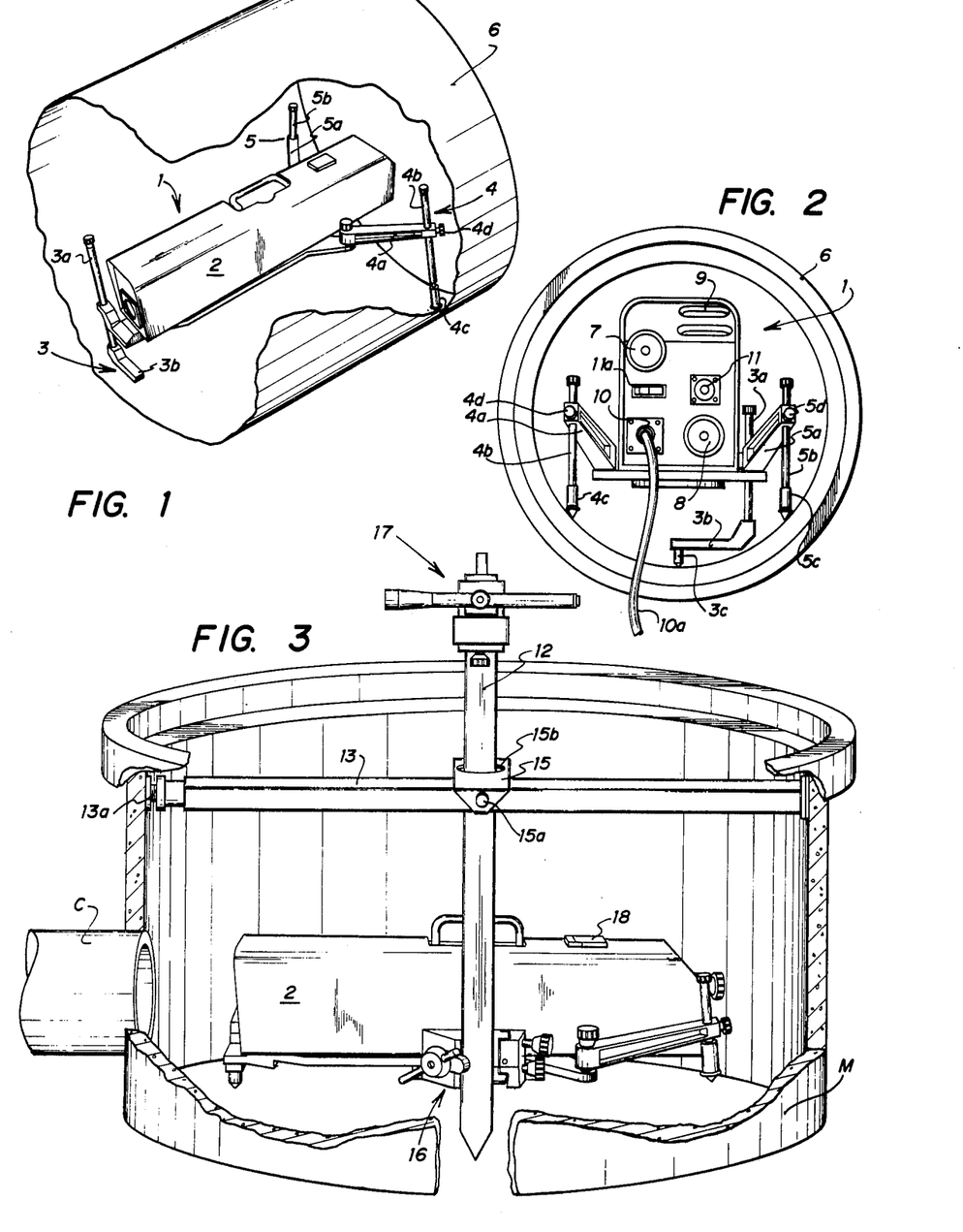
FIG. 1 is a perspective view of the light projection device of the present invention illustrating its use in a conduit for establishing a reference line along which the pipeline is to be laid.
FIG. 2 illustrates on a somewhat larger scale an end view of the light projecting apparatus illustrated in FIG. 1.
FIG. 3 is a perspective view of an alternative embodiment of the light projection apparatus of the present invention in use in establishing a reference line along which a pipeline is laid.

Referring now to the drawings wherein like reference characters designate like and corresponding parts throughout the several views, there is illustrated in FIG. 1 the preferred embodiment of the present invention wherein a light projection device 1 consists of an outer housing 2, a front adjustable leg 3 and two side adjustable legs 4 and 5. Front leg 3 consists of a vertical tubular section 3a joined to a horizontal lower foot member 3b. Attached to the underside of horizontal foot member 3b is foot pad 3c (FIG. 2) which has a downwardly facing conical surface adapted for engagement with the surface in which the unit is positioned. Food pad 3c is positioned on the vertical plane passing through the axis of the light beam projected from light projection device 1.

Side legs 4 and 5 include side extension members 4a and 5a, respectively. Slidably engaged through apertures at the outer end of side extensions 4a and 5a are vertical tubular legs 4b and 5b, respectively. Foot portions 4c and 5c are threadedly engaged on the lower end of vertical legs 4b and 5b and are pointed so that the legs rest on a single well defined point. Threadedly engaged through the end of side extensions 4a and 5a are set screws 4d and 5d, respectively, which may be advanced to secure vertical legs 4b and 5b at a selected vertical position. As will hereinafter be discussed in detail, by vertically adjusting the front leg 3 and horizontally and vertically adjusting side legs 4 and 5, light projection device 1 may be centered within conduit 6 for projecting a reference beam of light along its center line or at a specified grade angle therefrom.

FIG. 2 illustrates a rear view of light projection device 1 positioned in conduit 6 for projecting a reference beam of light along or at a desired vertical angle from the axis of conduit 6. Extending from the rear of light projection device 1 and operable from the opening to conduit 6, are grade control knob 7 and azimuth control knob 8. As will hereinafter be described in more detail, the beam of light projected by light projection device 1 may be reflected at desired angles from the horizontal by rotation of grade control knob 7. The grade of the projected beam is displayed on display screen 9 visible from the rear of the projection device. Azimuth control knob 8 controls the rotation of light projection device 1 relative to legs 3, 4 and 5 and permits the projection of the reference light beam through various horizontal angles from the axis of the conduit. The present device is constructed so as to be easily centered in any of a plurality of different sized conduits.

Electrical connector fittings 10 and 11 are suitably fastened to housing 2 at the rear of the projection unit. Electrical connector fitting 10 is adapted to receive power line 10a which supplies power to the projection device while electrical connector fitting 11 is adapted to receive a remote switch (not shown) for remote horizontal rotation of the unit by an operator at a distance from the projection device.

In this embodiment, light projection device 1 is positioned within a ground opening, such as a manhole M or the like, accessible to a conduit C. Light projection device 1 is attached near the lower end of a vertically disposed rod 12. Rod 12 has its lower end resting on the bottom of manhole M and is rotatably supported at its upper end from a support member 13. Extension member 13a is adjustably engaged within support member 13 for maintaining support member 13 engaged within manhole M.

Vertical rod 12 is rotatably supported from support member 13 by fitting 15. Fitting 15 is adapted with set screw 15a for selectively securing fitting 15 along the longitudinal axis of support member 13. Fitting 15 is further adapted with a rotatable sleeve member 15b which may be fixedly attached to rod 12. Light projection device 1 is adjustably attached to the lower end of vertical rod 12 by clamp assembly 16 while a transit device 17 is attached to the upper end of vertical rod 12. Attached to the upper side of housing 2 is level assembly cover 18. As will hereinafter be described in greater detail, a transit device 17 is employed to align light projection device 1 at a selected horizontal reference direction while the grade control mechanism of device 1 is employed to direct the reference beam along a predetermined grade. This reference beam is then employed to lay conduit 14 and successive conduit sections to form a pipeline along the selected reference axis.

Figure 4:
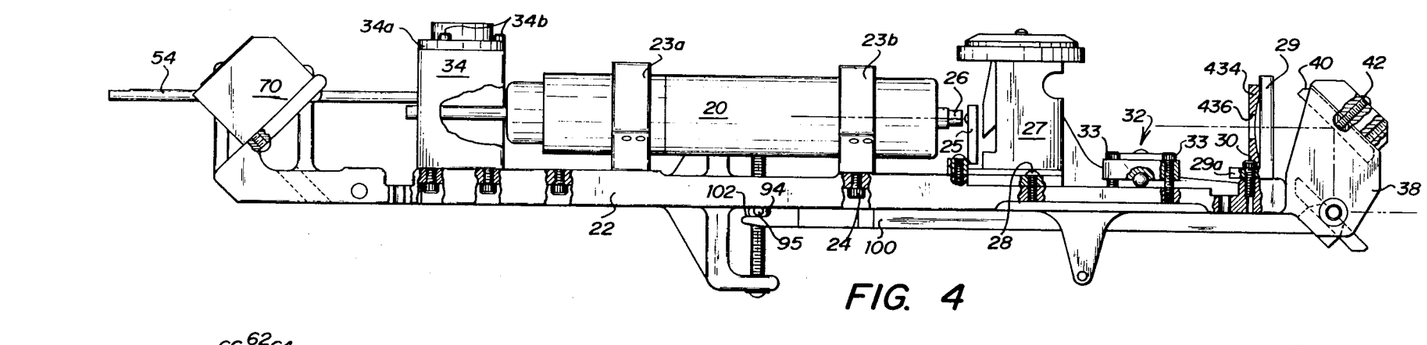
FIG. 4 is a side view, partially cut away, of the upper portion of the light projection device of the present invention.
Figure 5:
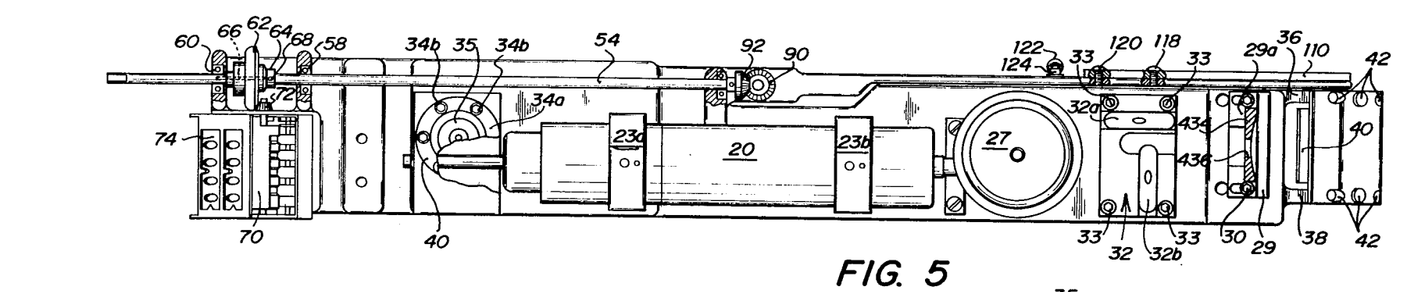
FIG. 5 is a top view of FIG. 4.
Figure 6:
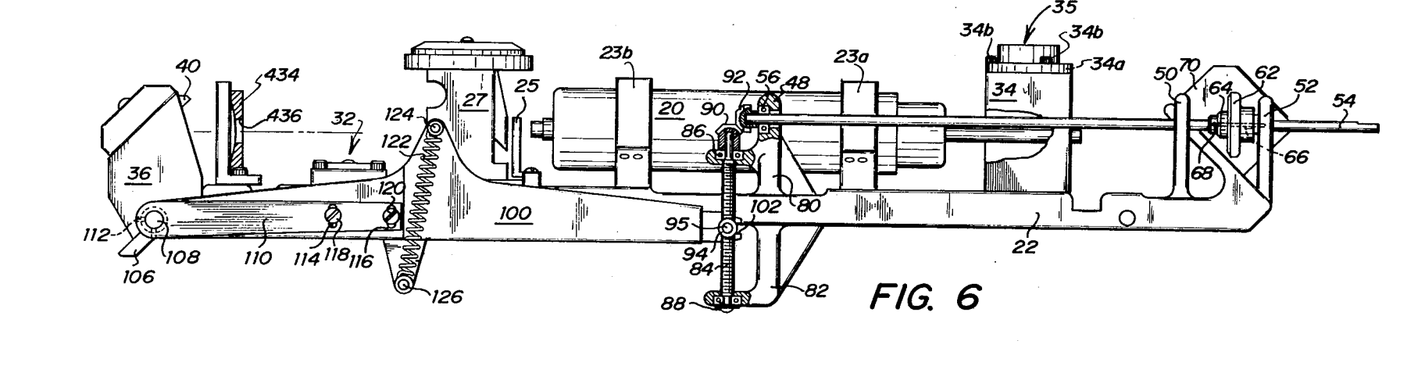
FIG. 6 illustrates a view from the reverse side of FIG. 4.

FIGS. 4–6 illustrate the top portion of the light projection mechanism of the present invention. Referring to FIG. 4, wherein a side view of the upper portion of the present system is shown with the outer housing removed, a laser 20 is mounted to frame 22 by attachment of collars 23a and 23b to frame 22 by cap screws 24. Laser 20 may be any of several suitable types of light projecting devices. However, devices generally categorized as lasers have been found to be the most appropriate for the purposes of the present invention.

A beam of light is transmitted by laser 20 through diverging lens assembly 25 attached to frame 22 and positioned immediately in front of outlet 26 of laser 20. Compensator 27 is attached to frame 22 immediately in front of lens assembly 25 and in the optical path of the beam of light projected by laser 20. Compensator 27 is secured to frame 22 by suitable fasteners such as cap screws 28. As will hereinafter be described, compensator 27 is designed to automatically self-level the beam of light produced by laser 20 such that minor movements of the beam projection device off the horizontal will not interfere with the set reference line formed by the beam of light.

Objective lens 29 is adjustably attached to frame 22 by cap screws 30. As may be seen in FIG. 5, the base portion 29a of objective lens 29 is slotted to accept cap screws 30 and provides for longitudinal adjustment of objective lens 29 relative to laser 20 and compensator 27. As is best seen in FIGS. 4 and 5, mounted intermediate of compensator 27 and objective lens 29, is level sensor assembly 32 which consists of two bubble levels 32a and 32b. Level 32a is fixed longitudinally of frame 22 and is used to level the assembly about the pitch axis while bubble level 32b is positioned transverse of the longitudinal axis and is used to level the assembly relative to the roll axis. The entire level assembly 32 is fixed to frame 22 by cap screws 33 positioned through each corner of the assembly.

Attached to frame 22 near the rear of laser 20 is a circular level assembly 34 consisting of a circular bubble balance viewable through horizontally positioned transparent window 35. Window 35 is retained against circular level assembly 34 by retaining ring 34a secured by cap screws 34b.

Support arms 36 and 38 extend from the far end of frame 22 and support top grade mirror assembly 40 which is positioned at an angle of approximately 45° to the longitudinal axis of frame 22. Top grade mirror assembly 40 is attached to supports 36 and 38 by suitable means such as socket screws 42.

As can best be seen in FIGS. 5 and 6, vertical supports 48, 50 and 52 extend from frame 22 and support grade shaft 54 for rotation thereon. Vertical supports 48, 50 and 52 are adapted with radial bearings 56, 58 and 60, respectively, on which grade shaft 54 rotates. Keyed to grade shaft 54 between supports 50 and 52 is bevel gear 62. Gear stop collar 64 is positioned adjacent bevel gear 62 about grade shaft 54 to retain gear 62 on key way 66. Gear stop collar 64 is fixedly attached to grade shaft 54 by pin 68.

Attached to frame 22 intermediate of supports 50 and 52 is digital counter assembly 70. Counter gear 72 extends from counter 70 and meshes with bevel gear 62. Thus, the rotation of grade shaft 54 is measured by counter 70 through the rotation of bevel gear 62 and counter gear 72. This rotation is recorded by counter 70 and displayed by appropriate digital readout on display screen 74 as seen in FIG. 5.

Grade screw 84 is rotatably supported by support arms 80 and 82 extending from frame 22. Rotation of grade screw 84 is facilitated by bushings 86 and 88 fixedly positioned in supported arms 80 and 82, respectively. Threadedly engaged on grade screw 84 is grade screw nut 94 having a shaft 95 extending horizontally therefrom. Grade screw 84 is adapted at its upper end with a miter gear 90 which meshes with a corresponding miter gear 92 fixedly attached on the end of grade shaft 54. Thus, rotation of grade shaft 54 results in a corresponding rotation of grade screw 84 and vertical translation of grade screw nut 94. Pivotably supported from frame 22 about axis pin 108 is subframe 100. One end of subframe 100 is adapted with slot 102 which engages shaft 95 of grade screw nut 94. Thus, the translation of grade screw nut 94 on grade screw 84 causes the rotation of subframe 100 about axis pin 108.

As is best seen in FIG. 6, grade mirror assembly 106 is attached to axis pin 108 extending through subframe 100 and adjustably attached to coarse adjustment grade arm 110. Axis pin 108 is secured to arm 110 by socket screw 112 extending through arm 110 and bearing against axis pin 108 of grade mirror assembly 106. Coarse adjustment grade arm 110 is provided with slots 114 and 116. Buttonhead socket screws 118 and 120 are fitted through slots 114 and 116, respectively, and are attached to subframe 100. Thus, grade mirror assembly 106 may be adjusted by movement of coarse adjustment grade arm 110 relative to subframe 100 through the limited arcs defined by slots 114 and 116. Additionally, fine adjustment of grade mirror assembly 106 is achieved by movement of grade screw nut 94 by the rotation of grade shaft 54 and corresponding rotation of grade screw 84 on which grade nut 94 translates.

Tension is placed on the point of contact between subframe 100 at slot 102 and shaft 95 and grade nut 94 by tension spring 122 which joins subframe 100 and frame 22 at spring posts 124 and 126, respectively.

Thus, by rotating grade shaft 54, a corresponding rotation of grade screw 84 is achieved. Correspondingly, grade screw nut 94 is moved either upwardly or downwardly depending upon the direction of rotation of grade shaft 54, and subframe 100 is angularly rotated caused a corresponding movement in grade mirror assembly 106. As may be seen in both FIGS. 4 and 6, light transmitted from laser 20 through compensator 27 and objective lens 29 is reflected from top grade mirror assembly 40 onto grade assembly mirror 106 and then out of the unit. The vertical angle or grade which the light assumes upon reflection from grade mirror assembly 106 is dependent upon the angular relationship between grade mirror assembly 106 and top grade mirror assembly 40. This relationship is controlled by the rotation of grade shaft 54 which is recorded by counter 70 through the interaction of bevel gear 62 and counter gear 72. The gearing between grade shaft 54 and counter 70 and the geometrical relation between the rotation of grade shaft 54 and the movement of grade mirror assembly 106 is so designed to permit a direct reading on digital display screen 74 of counter 70 corresponding to the percentage grade which the reflected beam of light from mirror assembly 106 will assume upon reflection therefrom.

Figure 7:
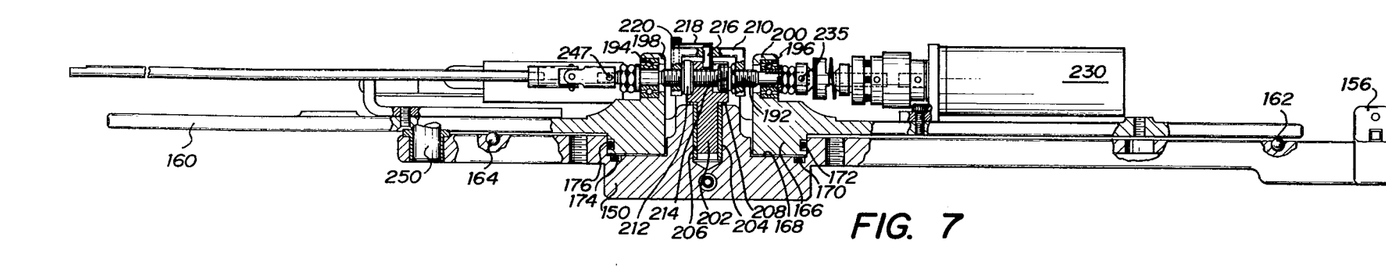
FIG. 7 is a side view, partially cut away along line 7—7 of FIG. 8, of the lower or base portion of the light projection device of the present invention.
Figure 8:
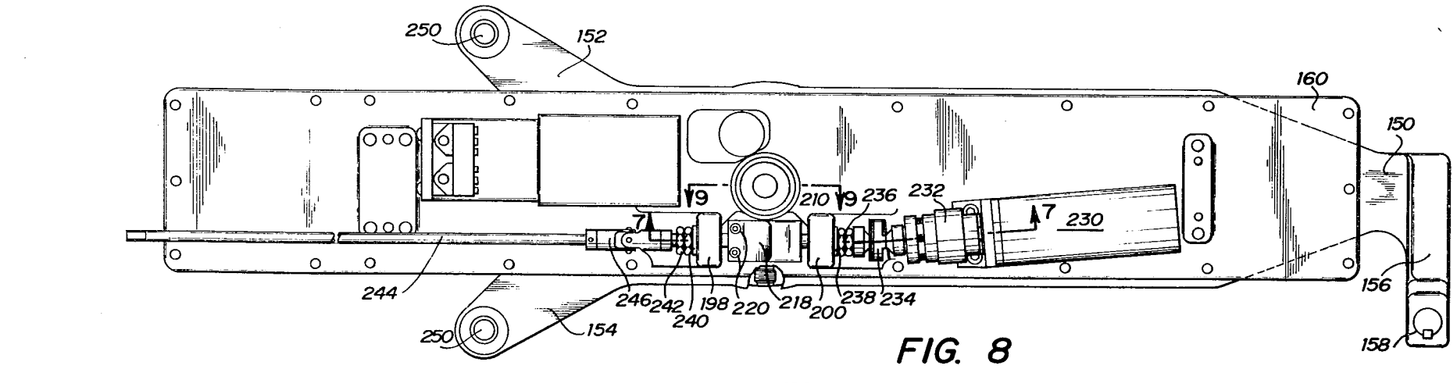
FIG. 8 is a top view of FIG. 7.
Figure 9:
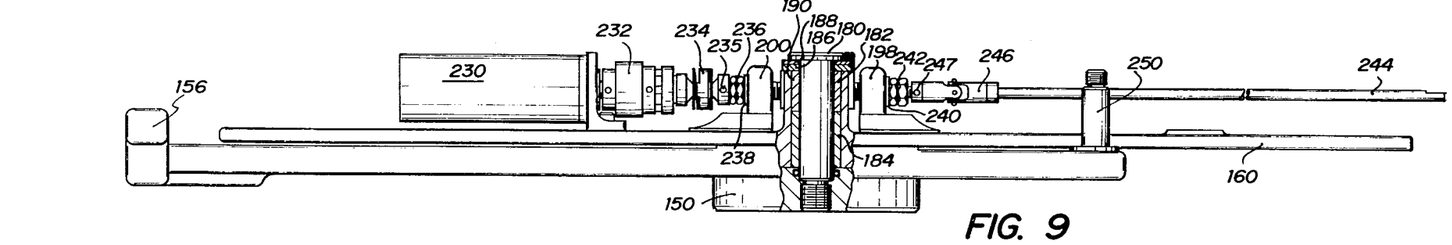
FIG. 9 illustrates the reverse side of FIG. 7, partially cut away along line 9—9 of FIG. 8.

FIGS. 7, 8 and 9 illustrate side and top views of the base portion of the light projection apparatus of the present invention. FIGS. 7 and 9 are partially cut-away to show the mechanism for controlling the azimuthal movement of the present apparatus. Referring to FIGS. 7-9, base member 150 consists of a primarily rectangular section having wing protrusions 152 and 154 extending therefrom. At one end of base member 150 is support extension 156 adapted with an aperture to accept the front leg member for the unit, hereinafter to be described.

The bottom plate member of the light projection apparatus, generally indicated by the numeral 160, is pivotally supported on base member 150 by ball bearings 162 and 164 which are substantially encased in base member 150 but which protrude above the surface thereof to support bottom plate member 160 for rotation over base member 150. Bottom plate member 160 has an annular extension 166 extending therefrom which mates within annular recess 168 formed in base member 150. The mating surfaces between annular extension 166 and annular recess 168 is sealed by O-rings 170 and 172 which are seated in annular grooves 174 and 176 in annular recess 168 and annular extension 166, respectively.

Referring to FIG. 9, bottom plate section 160 is pivotally attached to base member 150 by bearing shaft 180. Bearing shaft 180 is positioned through the axis of rotation of bottom plate member 160 and threadedly engages base member 150. Packing 182 and 184 separates bearing shaft 180 from bottom plate member 160 and permits the rotation of bottom plate member 160 about bearing shaft 180. The head of bearing shaft 180 is seated on washer 186 and thrust washer 188 which communicates with packing 182 and annular cylinder 190 extending vertically from bottom plate member 160.

Referring to FIGS. 7 and 8, azimuth control screw 192 is supported for rotation in bearings 194 and 196 housed in support arms 198 and 200, respectively, extending from bottom plate member 160. Azimuth screw 192 is threaded through azimuth pivot shaft 202 which has one end thereof seated in bore 204 in base member 150. Packing 206 surrounds azimuth pivot shaft 202 in its in-place position within bore 204 and thrust washer 208 supports the head of azimuth pivot shaft above the annular rim defining bore 204 thereby permitting rotation of shaft 202 in bore 204.

Azimuth screw nut 210 is of a U-shaped design having threaded bores longitudinally through the legs thereof adapted to accept the azimith screw 192. Azimuth nut 210 is positioned over the head portion of azimuth pivot shaft 202, and azimuth screw 192 is threadedly engaged through the threaded openings in the legs of the azimuth nut with the azimuth pivot shaft 202 therebetween. Spacer 212 and azimuth adjustment nut 214 are interspaced between the head of azimuth pivot shaft 202 and the legs of azimuth nut 210 with azimuth screw 192 passing therethrough. Spacers 212 and adjustment nut 214 have interior bores sufficiently larger than azimuth screw 192 such that there is no engagement between azimuth screw 192 and spacer 212 and adjustment nut 214.

Azimuth adjustment nut 214 is adapted with exterior threads for engagement with mating threads in the side of the head of azimuth pivot shaft 202. By disengaging the adjustment nut from pivot shaft 202 sufficient force may be quickly adjusted against azimuth screw nut 210 to fixedly bind nut 210 to pivot shaft 202. Extending centrally through the top of azimuth screw nut 210 is a cylindrical plunger 216 which is forced against azimith screw 192 by plunger spring 218 bearing against pluner 216 and retained in place by screw 220 attaching plunger spring to azimuth screw nut 210.

Motor 230 is fixedly attached to bottom plate member 160 and has an output shaft attached to slip clutch 232 and flexible coupling 234. The end of azimuth screw 192 is fixedly attached to coupling 234 by pin 235. Azimuth jam nut 236 is threaded onto screw 192 intermediate of coupling 234 and bearing 196 and retains azimuth screw bushing 238 against bearing 196. Through this linkage, energization of motor 230 results in the rotation of azimuth screw 192.

The opposite end of azimuth screw 192, outside of support arm 198, is joined to universal joint 246 by pin 247. Joined to the opposite end of universal joint 246 is azimuth shaft 244. Azimuth jam nut 242 threadedly engages azimuth screw 192 intermediate of joint 246 and bearing 194 and retains bushing 240 against bearing 194. Through this linkage, azimuth screw 192 may be manually operated by the rotation of azimuth shaft 244.

As may be seen from FIG. 8, azimuth pivot shaft 202, and therefore bore 204 in which shaft 202 is seated, are located off center from the axis of rotation of bottom plate member 160 and base member 150 which is defined by the axis of bearing shaft 180. Rotation of azimith screw 192 translates the screw through azimuth nut 210 which is fixedly attached to azimuth pivot shaft 202. The translation of azimuth screw 192 through nut 210 results in the rotation of bottom plate member 160 about base member 150 and therefore controls the azimuth direction of bottom plate member 160. The rotation of azimuth screw 192 may be either by the energization of motor 230 or by the manual rotation of azimuth shaft 244. The pressure of plunger 216 against azimuth screw 192 serves to prevent the unit from drifting from a selected setting.

As is best seen in FIGS. 8 and 9, wing protrusions 152 and 154 are adapted with vertical lugs 250 extending upwardly therefrom to accept the pivotable side legs of the unit hereinafter described.

Figure 10:
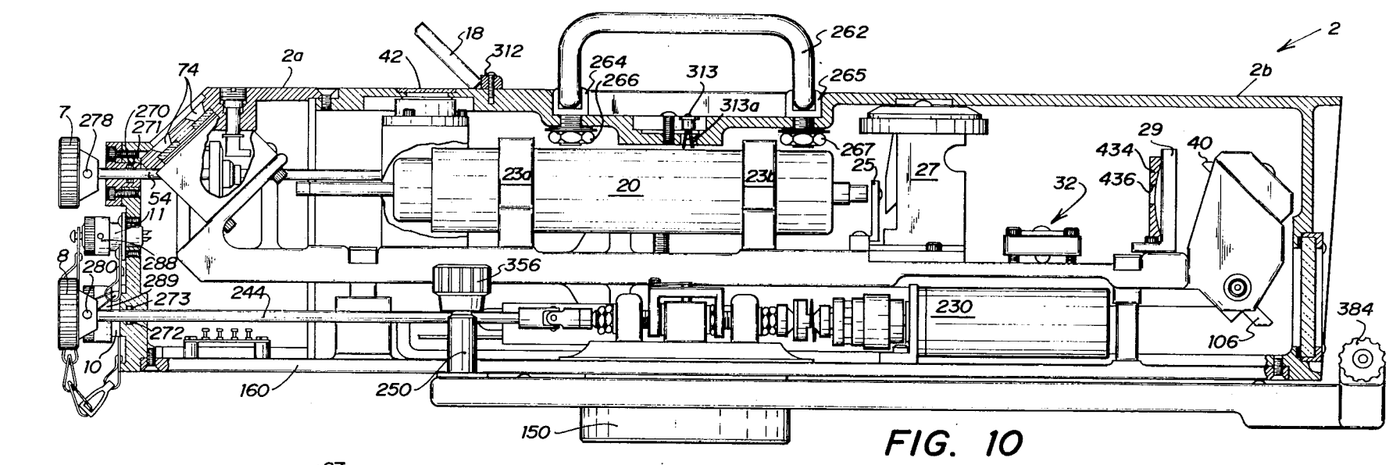
FIG. 10 is a partially sectioned side view showing the upper and lower portions illustrated in FIGS. 4-6 and 7-9 assembled and enclosed in a case.

FIG. 10 illustrates a partially cut-away side view of the assembled light projection apparatus wherein the top portion illustrated in FIGS. 4-6 is assembled on the bottom or base unti illustrated in FIGS. 7-9. Enclosing this assemblage is an outer housing 2 consisting of rear cover assembly 2a and body cover assembly 2b. Housing 2 is adapted with a handle 262 to facilitate carrying the assembled unit. Handle 262 is attached to housing 2 by nuts 266 and 267 engaging threaded lugs 264 and 265, respectively, inserted through apertures in the top of the case.

Referring to FIG. 10, it may be seen that grade shaft 54 passes through rear cover assembly 2a and is rotationally supported by O-ring 270 retained in annular groove 271 within rear cover assembly 2a. Similarly, azimuth control shaft 244 extends through the rear cover assembly 2a and is rotationally supported by O-ring 272 retained in annular groove 273 within the cover assembly. Both grade control shaft 54 and azimuth control shaft 244 are adapted with knobs 7 and 8, respectively, which are retained on the shafts by set screws 278 and 280, respectively. Through these knobs, positioned exteriorly of cover assembly 2, both the grade and azimuth setting of the unit relative to the base assembly 150 may be controlled.

As is best seen in FIGS. 2 and 10, electrical connector fittings 10 and 11 are suitably fastened to rear cover assembly 2a at the rear of the projection unit. Electrical connector fitting 10 is adapted to receive power line 10a which supplies power to laser 20 and motor 230. Electrical connector fitting 11 is adapted to receive a remote switch (not shown) which allows selective energization of motor 230 by an operator positioned at a distance from the projection unit. In this way, the azimuthal position of the unit may be controlled from a location at some distance from the unit. Alternatively, switch 11a, positioned at the rear of the unit, may be engaged to operate motor 230. Caps 288 and 289 are positioned over the outlets of electrical connector fittings 10 and 11, respectively, to prevent contamination of the fitting terminals when not in use.

With outer housing 2 in place, circular level assembly 34 may be viewed through an aperture in the top of body cover assembly 2a. Level assembly cover 18 is affixed by suitable screws such as cap screws 312 to the body cover assembly and normally covers window 35 of circular level assembly 34 for protection thereof.

Light 313 is attached through body cover assembly 2b such that the light emitted therefrom is viewable from the top of the unit. Light 313, whose function is hereinafter described, may be any illuminating unit. However, it has been found that a light emitting diode operates successfully for purposes of the present invention. Light 313 is connected by way of wiring 313a to the power source which powers the light means.

Figures 14, 15, 16:
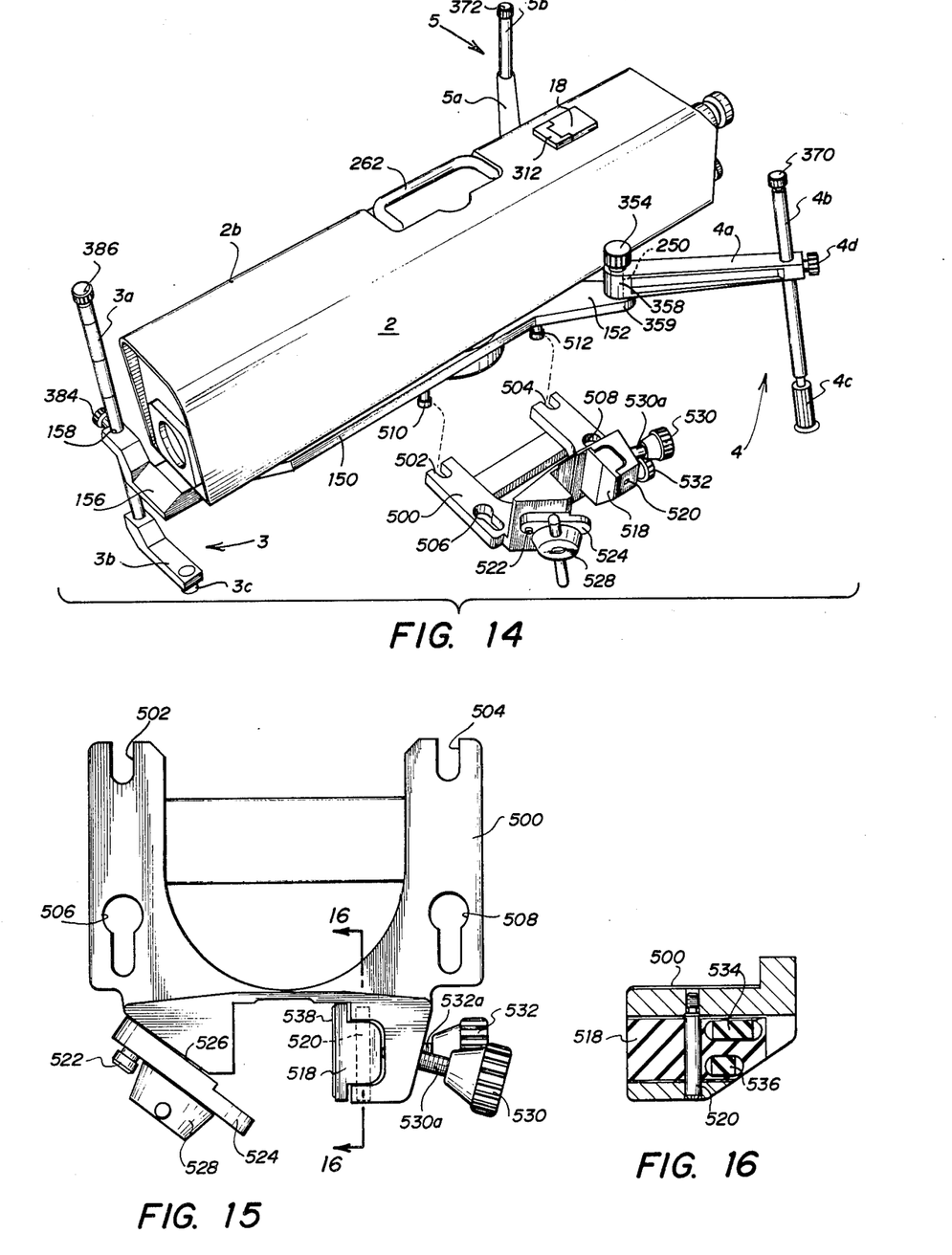
FIG. 14 is a perspective view of the light projection apparatus of the present invention showing the detachable rod clamp assembly fitted thereto.
FIG. 15 is a plan view of the detachable rod clamp assembly.
FIG. 16 is a sectional view taken along lines 16—16 of FIG. 15 and looking in the direction of the arrows.

Referring to FIG. 14, legs 4 and 5 consist of side extension members 4a and 5a, respectively, rotatably attached to vertical lugs 250 seated in wing protrusions 152 and 154 extending from base member 150. Side extensions 4a and 5a have apertures through the ends thereof substantially perpendicular to their longitudinal axes for accepting lugs 250. Lugs 250 have threaded ends to accept nuts 354 and 356 (not shown) which may be tightened down against side extensions 4a and 5a, respectively, to fix the relationship of the side extensions to the main body of the light projection device.

The mating surfaces between side extensions 4a and 5a with wing protrusions 152 and 154, respectively, are serations so that engagement of nuts 354 and 356 (not shown) positively engage the side extension members against protrusions 152 and 154, respectively. Indices 358 and 359 are marked on side extension 4a and wing protrusion 152, respectively, so that the rotation of the side extension away from the housing may be gauged. Similarly, indices 358 and 359 (not shown) are marked on adjacent sides of side extension 5a and wing protrusion 154. In this way, the position of side extensions 4a and 5a relative to the light projection apparatus may be synchronized to form identical angles with the body of the unit such that the ends thereof are equal distance from the body of the unit.

Legs 4 and 5 further consist of vertical tubular legs 4b and 5b, respectively, slidably engaged through apertures at the outer end of side extensions 4a and 5a, respectively. The legs may be slidably adjusted upwardly and downwardly by releasing set screws 4d and 5d. Vertical legs 4b and 5b are adapted at their upper ends with an oversized head 370 and 372 to prevent the legs from passing completely through the apertures in side extensions 4a and 5a. As may be seen in FIG. 14, the foot portion 4c and 5c of legs 4b and 5b are threadedly engaged thereon and are pointed so that the legs rest on a single well defined point. Thus, the side legs 4 and 5 of the light projection apparatus consist of side extensions which rotate about a vertical axis and may be set at any horizontal angle to the main body of the unit. Attached at the outer end of these extensions are the vertically adjustable legs.

Referring to FIG. 14, front leg 3 of the unit consists of a vertical tubular section 3a joined to a horizontal lower foot member 3b. Attached to the underside of horizontal foot member 3b is foot pad 3c which has a conical face adapted for engagement with the surface on which the unit is positioned. Pad 3c is positioned on the vertical plane passing through the axis of the light beam projected from the unit. The vertical tubular section 3a is slidably received within aperture 158 of front support extension 156 and is retained in a selected position by set screw 384. Tubular section 3a has measured indentations therein which indicate to the operator selected dimensions from the bottom of foot pad 3c to the light beam projected from the unit. Tubular section 3a is further adapted at its upper end with cap 386 which prevents the front leg unit from passing completely through aperture 158 in front support extension 156.

In laying pipeline, it is many times necessary to project a reference line in the vertical plane through the center line and parallel to the center line of pipeline previously laid so that extension added thereto may be laid along the same axis as the existing pipeline. The present light projection apparatus provides a system for quickly and easily projecting such a reference line. Referring to FIGS. 1 and 2, the light projection apparatus is inserted within the existing conduit 14 positioning the foot pad 3c of front leg 3 on the lower most point of the pipe and thus in the vertical plane of the center line of the pipe. Because foot pad 3c of the front leg is positioned on the vertical plane passing through the axis of the reference line projected by the unit, the reference beam is thereby positioned in the vertical plane of the center line of the pipe.

The side extensions 4a and 5a of side legs 4 and 5 are then rotated outwardly until the foot portion 4c and 5c of vertical legs 4b and 5b, respectively, engage the side walls of the pipe as shown in FIG. 2. By rotating side extensions 4a and 5a through equal angles as indicated by indices 358 and 359 on side extension 4a and 5a and wing protrusions 152 and 154, the rear portion of the projection unit is centered on the vertical plane passing through the center line of the pipe.

Side extensions 4a and 5a may be interconnected through appropriate gearing (not shown) such that the movement of one extension away from the projection unit results in a corresponding and equal movement of the opposite extension from the projection unit. In this way, the extensions are always positioned at an identical angle from the unit.

Vertical legs 4b and 5b are then vertically adjusted until the light projection apparatus is leveled by viewing circular level assembly 34 through cover 18 on the top of the unit. With this adjustment, the laser beam projected by the projection apparatus passes through the perpendicular bisector of the chord subtended by the points of contact between the side legs of the unit and the pipe in which the unit is positioned. By turning the grade adjustment knob 274 on the rear of the light projection device of the present invention, to adjust the grade of the beam projected to equal that of the pipe in which the unit is positioned, the reference beam generated by the unit is in the vertical plane passing through the center line of pipe and parallel to the center line. The use of the reference beam to lay new pipe along the extension of the center line of the old pipe is the same as in the prior art where a target is used in the end of the new pipe remote from the light projection device. As the use of a target in conjunction with the reference beam is old in the art, further detail of its application is omitted.

Where a different grade is desired, the operator simply adjusts the grade control of the light projection device to any desired grade setting. The reference beam produced will be of the desired grade but in the vertical plane through the center line of the existing pipeline.

Thus, it may be seen that using the arrangement of support members provided by the present invention, the desired reference beam may be generated with minimal adjustments. Further, all necessary adjustments may be made either before or with the light projection device within the pipeline as all the controls and other necessary adjustments are readily accessible at the rear of the unit.

Similarly, the azimuth adjustment may be made manually by rotating knob 8 positioned at the rear of the unit which controls the rotation of the housing relative to the base and support legs extending therefrom. Alternatively, horizontal angle changes may be made by energizing motor 230 by turning switch 11a or by use of a remote switch as heretofore described, until the desired rotation is obtained.

Figure 11:
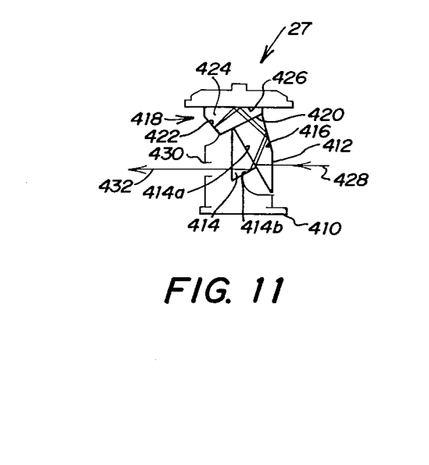
FIG. 11 illustrates, in sectional view, an automatic self-leveling beam compensator of the present invention.

FIG. 11 illustrates diagramatically the preferred embodiment of the automatic leveling compensator 27 used in the system of the present invention. As has been previously described, the desired grade angle is set and the unit is leveled thereby projecting a reference light beam along the desired grade. Thereafter, azimuth directional adjustments are made. However, during such additional adjustments or through other external interferences with the unit, the light projection apparatus may inadvertently be disturbed from its level configuration. Additionally, the leveling mechanism attached to the unit and relied on by the operator to provide a true horizontal reference may not be completely accurate where the leveling apparatus is not properly aligned with the axis of the laser unit which projects the reference beam. The compensator disclosed herein is designed to automatically self-level the beam of light produced by laser 20 such that minor movements of the beam projection device off the horizontal will not interfere with the accurate projection of a reference beam of light.

As shown in FIG. 11, compensator 27 includes a housing 410 having a window 412 aligned with the beam of light directed from laser 20 through lens assembly 25. Included within housing 410 is prism 414 and reflective surface 416. Rigidly attached at the upper end of housing 410 is fluid tight container 418 having one lower surface 420 formed of optical glass or glass type material. Side 422 of container 418 is formed of a totally reflective material. Container 418 is filled with a clear fluid 424 which generates a liquid-air interface 426.

In operation of the compensator, a beam of light 428 is directed through window 412 and against surface 414a of prism 414. Because prism 414 and surface 414a are so positioned such that the beam of light 428 contacts the surface at an angle greater than the critical angle of reflection, the beam of light is reflected from surface 414a. Light radiation reflected from surface 414a of prism 414 is again reflected from surface 416 and passes into a fluid container 418 through lower surface 420 which is substantially normal to the beam passing therethrough to minimize any reflection therefrom. Side 414a and reflective surface 416 are so arranged as to cause the beam of light to impinge the interface 426 of fluid 424 at an angle greater than the critical angle of reflection. As a result, substantially all of the light impinging interface 426 is reflected therefrom onto reflective side 422 and back against interface 426. As the reflected beam again impinges interface 426 at an angle greater than the critical angle of reflection, substantially all of the light is returned against reflective surface 416 through prism 414 and is reflected from wall 414b along final optical path 432.

Housing 410 is rigidly attached to frame 22 as is laser projector 20. As a result thereof, any movement of frame 22 results in a corresponding movement of housing 410 and attached liquid container 418. It will be observed that as a result of the action of gravity on fluid 424, the interface 426 of fluid 424 will always parallel to true horizontal. Where the input beam 428 is parallel to interface 426, as will be the case when beam 428 is directed along the true horizontal, final optical path 432 will be parallel to the input beam 428 as no correction is necessary. However, as input beam 428 deviates from the true horizontal, the final optical path 432 will be compensated therefore by the reflection from horizontal interface 426.

In some configurations of the present compensator, there is an over compensation for the angle of deviation between input beam 428 and true horizontal such that a positive angle of deviation of $\phi$ results in a positive angle of compensation $n\phi$. In this embodiment of the invention, a shield 434 is positioned in front of objective lens 29. Shield 434 has an aperture 436 therein such that when the unit is sufficiently tilted off horizontal, over compensation for the angle of deviation caused by compensator 27 diverts the light beam outside aperture 436 where it is shielded by shield 434. In this way, when the unit is tilted beyond a predetermined angle, no light is emitted from the unit as a result of the shielding of objective lens 29 by shield 434. Therefore, the operator is immediately made aware of the large deviation from horizontal, and the unit may be leveled by using the leveling adjustments.

Where the deviation is not so great, the light beam passes through aperture 436 of shield 434 and passes through objective lens 29. The over compensation generated in compensator 77 is readily determinable by the configuration of the prism 414 and reflective surfaces in the compensator. This over compensation is adjusted by use of subsequent lens (not shown) in the final optical path and prior to the reflection of the light beam from top grade mirror assembly 40. Thus, minor deviations of the light beam from laser unit 20 are automatically compensated through the use of nonmechanical compensator 27 using the liquid-air interface 426 as the adjustment mechanism.

Figure 12:
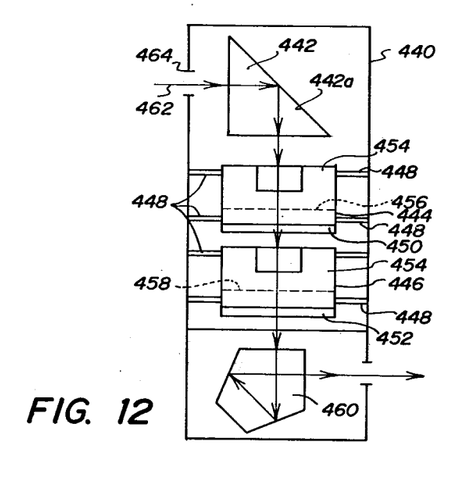
FIG. 12 illustrates, in sectional view, another automatic self-leveling beam compensator of the present invention.

FIG. 12 diagramatically illustrates an alternate compensating unit for self-leveling the laser beam generated by laser unit 20. This compensator consists of a housing 440 including a prism 442 having a side 442a positioned at an angle of 45° to the vertical and two fluid containers 444 and 446 rigidly attached to the walls of the housing 440 by support members 448. Containers 444 and 446 are constructed with glass or glass type bottoms 450 and 452, respectively, and in operation are filled with a liquid 454 which has an index of refraction substantially equal to that of glass bottoms 450 and 452. It has been found that the accuracy of the self-leveling compensating unit is greatly improved where the sum of the refractive indices of the liquid in container 444 and the liquid in container 446 be approximately 3. In the preferred embodiment of the present invention, the refractive index of each of the liquids is 1.5. However, it will be understood that any combination of indices summing to 3 would generate equivalent accuracy in compensating for minor deviations of the light beam from horizontal. Liquid 454 forms a liquid-air interface 456 at the upper surface of the liquid 454 in container 444, and a similar liquid-air interface 458 is formed in container 446. Rotatably supported below liquid container 444 and 446 is pentaprism 460.

In operation, the compensating unit illustrated in FIG. 12 is positioned between objective lens 29 and top grade mirror assembly 40 (see FIG. 4). Alternatively, the compensating unit illustrated in FIG. 12 may be used to replace top grade mirror assembly 40 by substituting the compensating unit for top grade mirror assembly 40 such that light projected by laser 20 is directed through window 464 of the compensating unit for reflection from surface 442a of prism 442. In this embodiment of the invention, pentaprism 460 is removed and the light passing through containers 454 is directed against grade mirror assembly 106 for protection out of the unit.

Where the compensating unit is positioned between objective lens 29 and top grade mirror assembly 40, light beam 462 from laser unit 20 is projected through window 464 which is aligned with the output of laser 20. Beam 462 is reflected from surface 442a of prism 442 and is directed vertically through fluid containers 444 and 446. As the beam emerges from containers 444 and 446, pentaprism 460 changes the direction of the beam from the vertical to the horizontal.

Figure 13:
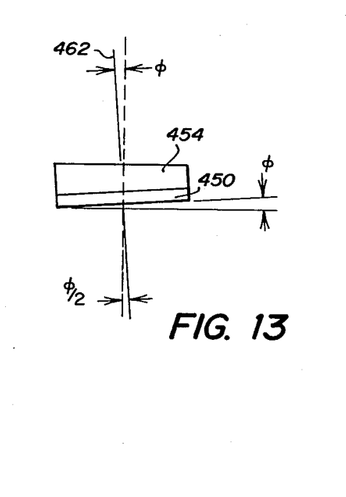
FIG. 13 is a schematic view of a portion of FIG. 12 presented to illustrate the principal of the automatic self-leveling beam compensator of FIG. 12.

The operation of the correcting aspect of the compensator described in FIG. 12 is explained by reference to FIG. 13 which shows the glass bottom 450 of container 444 and liquid 454 contained thereover. FIG. 13 shows the glass bottom 450 as tilted through a slight angle from the horizontal indicated by the symbol $\phi$. As is well known in the field of optics, as the beam 462 passes through a clear wedge of relatively small angle, it is diverted by an angle equal to one-half of the angle of the surfaces of the wedge. This principle is valid where the angles between the surfaces of the wedge have substantially equivalent tangent and sine values. The compensator used in the present invention provides two such wedges arranged in tantem fashion so that the correction for a deviation equal to the angle $\phi$ is equal to that angle of deviation. Where light beam 462 deviates from the horizontal by an angle $\phi$, the glass bottoms 450 and 452 of containers 444 and 446, respectively, likewise form an angle $\phi$ with the true horizontal as the compensator 27 and laser beam projection apparatus 20 are assembled on the common frame 22 and any deviation of one results in a corresponding deviation of the other. However, the fluid interfaces 456 and 458 move under the influence of gravity until these surfaces stabilize at the horizontal, thus establishing an angle between these upper surfaces of fluid 454 and the glass bottoms of containers 444 and 446.

Similarly, where light beam 462 deviates from the horizontal by an angle of $\phi$, the reflection from side 442a of prism 442 will deviate from the true vertical by an angle of $\phi$. In accordance with the principal above described, by passing this beam of light through the fluid containers 444 and 446 where the interfaces 456 and 458, respectively, of the fluid contained therein form an angle $\phi$ with bottoms 450 and 452, the reflected beam 462 from side 442a is corrected by an angle equal to the deviation of beam 462 from the horizontal. As a result, the beam exiting from the fluid container is true vertical, and the beam exiting from pentaprism 460 is true horizontal. Thus, the deviated laser beam 462 has been corrected to the true vertical so that its direction of projection out of the lower end of housing 440 is the same as it was before the deviation was introduced. As with the compensator illustrated in FIG. 11, the correction is completely nonmechanical and automatic.

FIG. 3 illustrates the light projection device positioned within a ground opening, such as the manhole M or the like, accessible to a conduit C. Light projection device 1 is attached near the lower end of a vertically disposed rod 12 by clamp assembly 16. Rod 12 has its lower end resting on the bottom of manhold M and is rotatably supported at its upper end from a support member 13. Support member 13 may be an expandable member having an adjustable end 13a which may be threadedly engaged within the support member for adjustment therein. Likewise, the end portion 13a may act against an inner spring (not shown) such that the support member may be adjustably positioned against the side wall of a manhole as shown in FIG. 3.

Vertical rod 12 is rotatably supported from support member 13 by fitting 15. Fitting 15 is adapted with set screw 15a which allows the fitting to be selectively secured along the longitudinal axis of support member 13. Fitting 15 is further adapted with a rotatable sleeve member 15b which may be fixedly attached to rod 12, thereby permitting angular rotation of rod 12 about its longitudinal axis. A set screw 484 (not shown) is also provided to fixedly secure rotatable sleeve member 15b to fix the angular position of vertical rod 12 relative to support member 13. The light projection device is adjustably attached to the lower end of vertical rod 12 by clamp assembly 16. Attached to the upper end of vertical rod 12 is an appropriate line-of-sight or transit device 17.

Positioning transit 17 vertically above the light projection device of the present invention is facilitated by viewing the light 313, visible from the top of the light projection device. The arrangement of transit 17 and light projection device 1 relative to the longitudinal axis of the rod 12 is such that by sighting downwardly through transit 17 onto light 313, rod 12 is accurately positioned in a vertical plane through the longitudinal axis of the rod.

Vertical rod 12 is approximately indexed so that the transit 17 and light projection device 1 may be angularly adjusted to align their longitudinal axes in a common plane parallel to rod 12. In this arrangement, angular adjustment of the transit to accurately sight it in a given horizontal direction will automatically align the light projection device in the same direction.

In operation, the light beam projected by the projection device is aligned along an axial center line along which the completed pipeline is to extend. In projecting the reference beam, the horizontal direction of the pipeline is set by viewing a target positioned along the selected horizontal direction through transit 17. This automatically positions light projection device 1 and its projected light beam in a vertical plane through the line of sight axis and selected horizontal position. The light projection device is then leveled by making appropriate adjustments in clamp assembly 16 and by reference to circular level assembly 34 viewable from the top of the light projection device beneath level assembly cover 18. With these adjustments, the reference beam projected by the light projection device coincides with the axial center line along which the pipeline is to be laid. To facilitate laying of the pipeline along this reference beam, a target device (not shown) for intercepting the reference beam is inserted in the end of each pipe section as it is laid so that the center of the pipe section may be more easily aligned with the reference beam.

In this use of the light projection device of the present invention, the device is attached near the lower end of vertical rod 12 which has its lower end resting on the bottom surface of the manhole. Thus, legs 3, 4 and 5 are retracted upwardly and do not make contact with the ground surface above which the light projection device is positioned.

FIG. 15 illustrates a plan view of detachable rod clamp assembly 16. FIG. 14 is a perspective view showing the attachment of clamp assembly 16 to the light projection device. Bracket 500 is adapted with slots 502 and 504 and apertures 506 and 508. As is seen in FIG. 14, apertures 506 and 508 are adapted to engage pins 510 and 512, respectively, extending from base member 150. Likewise, slots 502 and 504 are adapted to engage similar pins 514 and 516 (not shown) attached to base member 150. Pins 510 and 512, 514 and 516 are threadedly engaged into base member 150. The heads of pins 510, 512, 514 and 516 are larger than slots 502 and 504 and the narrower portions of apertures 506 and 508, and bracket 500 is secured thereto by engaging the slots around the shank of the pins. The clamp assembly is secured to base member 150 by tightening pins 510–516 against the bracket assembly.

The portion of bracket 500 extending to the side of the light projection device is adapted with a level adjusting foot 518 which is pivotally attached to bracket 500 by pivot screw 520 as shown in FIG. 15. With level adjustment foot 518 in place, bracket 500 forms a U-shaped clamp configuration sized to accept vertical rod 12 as shown in FIG. 3. Pivotally attached by screw 522 to bracket 500 is hook plate 525. Hook plate 524 has a slot therein which allows it to be rotated over shaft 526 extending from clamp knob 528 and threadedly engaging bracket 500. Threadedly engaged through bracket 500 and protruding through the seat of level adjustment foot 518 against bracket 500 is adjustment knob assembly 530 and lock knob assembly 532.

In operation, hook plate 524 is rotated away from the area adapted to accept vertical rod 12, and the clamp assembly is positioned about rod 12. Hook plate 524 is then rotated about screw 522 until it engages shaft 526 of clamp knob 528 and rests thereon. Hook plate 524 is then locked into place by turning clamp knob 528 which engages hook plate 524 against bracket 500. By tightening down on clamp knob 528, rod 560 is forced against level adjustment foot 518, and the clamp assembly is secured to rod 12. The face of level adjustment foot 518 is adapted with a slip-resistant surface 518a to provide a more positive grip on vertical rod 12.

Adjustment rod assembly 530 is used to vary the vertical angle of the light projection device. Because the threaded shaft 530a of adjustment knob assembly contacts level adjustment foot 518 above pivot screw 520, by advancing shaft 530a, the light projection device, and the light beam generated therefrom, are tilted upwardly. By unscrewing adjustment knob assembly 530, the light beam generated by the light projection device is rotated downwardly to give a positive grade. When the desired horizontal angle is achieved, lock knob assembly is engaged until threaded shaft 532a of lock knob assembly 532 engages the back side of level adjustment foot 518 to prevent rotation of foot 518 about pivot screw 520.

Referring to FIG. 16, rubber inserts 534 and 536 extend from cavities in level adjustment foot 518 and bear against bracket 500. These rubber inserts serve as spring means to allow rotational adjustment of level adjustment foot 518 about horizontal axis of pivot screw 520 to be accomplished by turning the single adjustment knob assembly 530.

Thus, the present invention defines a new and improved system for projecting and utilizing a light beam as a reference line for construction purposes. The system employs the use of a laser or other light projecting device mounted in a housing and having an automatic nonmechanical leveling compensator means for intercepting the beam of light emitted from the laser unit for automatically correcting slight deviations of the light beam from true horizontal. The automatic compensators have a liquid-air interface which due to the action of gravity is always parallel to true horizontal. Compensation of the light beam is effected by the reflection of the beam of light from the interface or by passing the beam of light through the interface.

The unit is provided with a vertically adjustable front leg and a horizontally pivotable leg attached to each side of the unit near the rear thereof. The horizontally pivotable rear legs are adapted with vertically extendable members so that the housing may be centrally positioned in a conduit and leveled by the vertical adjustment of the front and rear legs. The light projection system further comprises means controllable from the rear of the unit for deflecting the light beam in a vertical plane to vary the grade of the beam projected by the device. An indicator, readable from the rear of the unit, is provided for indicating the grade at which the light beam is projected.

The system further includes means connected between the support legs and housing for rotating the housing in a horizontal plane thereby providing for azimuthal adjustment of the light beam projected therefrom. A manually operated mechanical override, operable from the rear of the unit, is further provided for manually rotating the housing relative to the legs in the horizontal plane.

Additionally, the unit is adaptable for use as a reference beam projector in inaccessible locations. In this embodiment of the invention, the light projection device is aligned horizontally by adjustments made at a location remote from the unit.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for projecting and utilizing a light beam as a reference line for laying conduit comprising:
    a housing;
    a light beam projecting device mounted in said housing;
    light compensator means within said housing for intercepting said beam of light and automatically deflecting said beam of light through an angle of $n\phi$ when the longitudinal axis of the beam of light projected from the light projecting device is tilted at an angle of $\phi$ from true horizontal, said compensator having a liquid-air interface remaining parallel to true horizontal to provide compensation;
    a shield member mounted within said housing on the opposite side of the light compensating means from said light beam projecting device and having an aperture therein aligned with the path of the undeflected beam of light projected from said light beam projecting device through said light compensator means, the aperture within said shield being of a predetermined size to prevent the passage of the beam of light therethrough when the beam of light projected by the light beam projecting device deviates a predetermined angle from true horizontal.

2. The light projection system of claim 1 and further comprising:
    lens means positioned on the opposite side of said shield member from said compensator means for adjusting for the over compensation of the light beam from true horizontal by said light compensator means so that the path of the light beam is along the true horizontal upon passage therethrough.

* * * * *

UNITED STATES PATENT AND TRADEMARK OFFICE
CERTIFICATE OF CORRECTION

PATENT NO. : 4,043,679

DATED : August 23, 1977

INVENTOR(S) : Lyndell J. C. George and Robert S. Shelly

It is certified that error appears in the above-identified patent and that said Letters Patent are hereby corrected as shown below:

Col. 4, line 56, "food" should be --foot--.
Col. 11, line 13, "extension" should be --extensions--.

Col. 16, line 33, "525" should be --524--.

Signed and Sealed this

Second Day of May 1978

[SEAL]

Attest:

RUTH C. MASON
Attesting Officer

LUTRELLE F. PARKER
Acting Commissioner of Patents and Trademarks